United States Patent
Tanabe et al.

(10) Patent No.: US 10,009,454 B2
(45) Date of Patent: Jun. 26, 2018

(54) MOBILE ELECTRONIC DEVICE, CONTROL METHOD, AND NON-TRANSITORY STORAGE MEDIUM

(71) Applicant: KYOCERA Corporation, Kyoto-shi, Kyoto (JP)

(72) Inventors: Shigeki Tanabe, Yokohama (JP); Hideki Morita, Yokohama (JP); Isao Masuike, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/305,348

(22) PCT Filed: Jul. 30, 2014

(86) PCT No.: PCT/JP2014/070106
§ 371 (c)(1),
(2) Date: Oct. 20, 2016

(87) PCT Pub. No.: WO2015/162806
PCT Pub. Date: Oct. 29, 2015

(65) Prior Publication Data
US 2017/0048379 A1    Feb. 16, 2017

(30) Foreign Application Priority Data
Apr. 24, 2014    (JP) .................................. 2014-090544

(51) Int. Cl.
H04M 1/00 (2006.01)
H04M 1/725 (2006.01)
H04M 19/04 (2006.01)

(52) U.S. Cl.
CPC ....... H04M 1/72569 (2013.01); H04M 19/04 (2013.01); H04M 2250/12 (2013.01)

(58) Field of Classification Search
CPC ............ H04B 1/3827; H04M 1/72563; H04M 1/72597; H04M 2250/12
(Continued)

(56) References Cited

U.S. PATENT DOCUMENTS 8,583,095 B2 * 11/2013 Nakae ................... H04M 1/575
                                                          455/567
8,655,321 B2 *  2/2014 Baer .................. H04M 1/72563
                                                          455/412.2
(Continued)

FOREIGN PATENT DOCUMENTS

JP     2006-303565 A      11/2006
JP      2014-45325 A       3/2014
JP     2014045325 A  *    3/2014

OTHER PUBLICATIONS

International Search Report in PCT/JP2014/070106, dated Aug. 26, 2014.

*Primary Examiner* — Quochien B Vuong
(74) *Attorney, Agent, or Firm* — Hauptman Ham, LLP

(57) ABSTRACT

According to one aspect, a mobile electronic device includes an acceleration detector, and a controller configured to determine a moving state based on an acceleration pattern measured through a result of detection by the acceleration detector. When an event notified while the mobile electronic device is determined to be in the moving state is not responded by a user, the controller gives notification again of the event. For example, in the case of having detected a change of the acceleration pattern from a moving pattern to a stopping pattern, the mobile electronic device) determines whether there is an event notified while the mobile electronic device was determined to be in the moving state (operational in a moving mode).

1 Claim, 5 Drawing Sheets

(58) Field of Classification Search
USPC ... 455/412.1, 412.2, 413, 414.1, 415, 550.1, 455/566, 567
See application file for complete search history.

(56) References Cited

U.S. PATENT DOCUMENTS

| | | | | |
|---|---|---|---|---|
| 8,914,075 | B2* | 12/2014 | Pasquero | H04M 1/7253 455/412.2 |
| 9,002,326 | B2* | 4/2015 | Santo | H04M 19/048 455/412.2 |
| 9,607,136 | B2* | 3/2017 | Davis | G06F 21/31 |
| 2016/0037482 | A1* | 2/2016 | Higgins | H04W 68/005 455/414.1 |

* cited by examiner

FIG.2

| EVENT GENERATION TIME | EVENT CONTENTS | PRESENCE OR ABSENCE OF RESPONSE |
|---|---|---|
| 12:00 | INCOMING MAIL | PRESENT |
| 12:03 | INCOMING CALL | PRESENT |
| 12:15 | POP-UP NOTIFICAITON OF SCHEDULE | ABSENT |
| ⋮ | ⋮ | ⋮ |

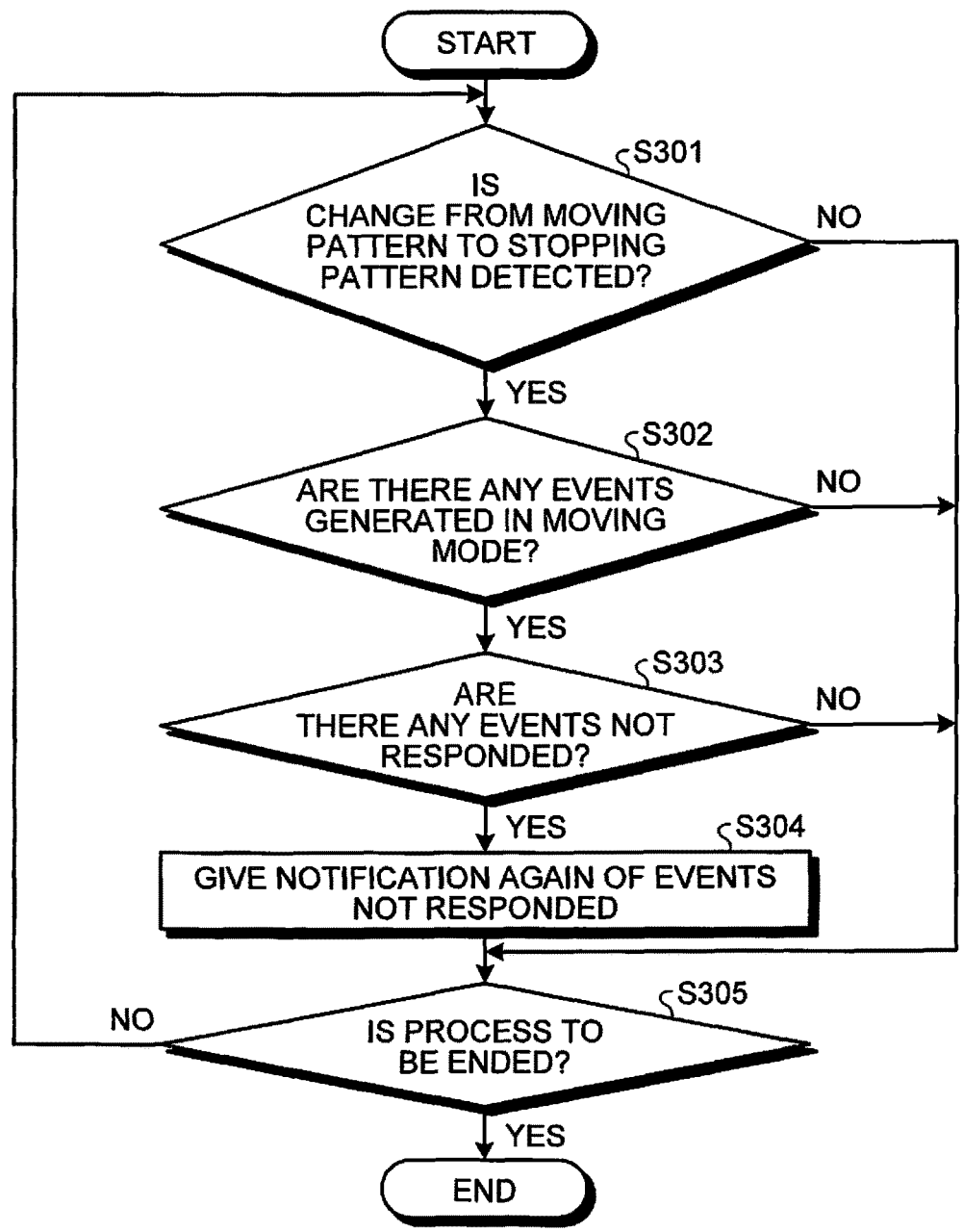

US 10,009,454 B2

MOBILE ELECTRONIC DEVICE, CONTROL METHOD, AND NON-TRANSITORY STORAGE MEDIUM

RELATED APPLICATIONS

The present application is a National Phase entry of International Application No. PCT/JP2014/070106, filed Jul. 30, 2014, which claims priority of Japanese Application No. 2014-090544, filed Apr. 24, 2014.

FIELD

The present invention relates to a mobile electronic device, a control method, and a storage medium.

BACKGROUND

Japanese Patent Application Laid-open No. 2006-303565 discloses an electronic device configured to determine moving state of a user of the electronic device based on a detection signal output from an acceleration sensor and notify any missed call through a vibrator depending on a result of the determination.

SUMMARY

A mobile electronic device, a control method, and a non-transitory storage medium are disclosed.

According to one embodiment, there is provided a mobile electronic device comprising: an acceleration detector; and at least one controller configured to determine a moving state of the mobile electronic device based on an acceleration pattern measured through a result of detection by the acceleration detector, wherein, when an event notified while the mobile electronic device is determined to be in the moving state is not responded by a user of the mobile electronic device, the at least one controller gives notification again of the event.

According to one embodiment, there is provided a control method executed by a mobile electronic device including an acceleration detector, the method comprising: determining a moving state of the mobile electronic device based on an acceleration pattern measured through a result of detection by the acceleration detector; and giving notification, when an event notified while the mobile electronic device is determined to be in the moving state is not responded by a user of the mobile electronic device, again of the event.

According to one embodiment, there is provided a non-transitory storage medium storing therein a control program configured to cause a mobile electronic device including an acceleration detector to execute a process comprising: determining a moving state of the mobile electronic device based on an acceleration pattern measured through a result of detection by the acceleration detector; and giving notification, when an event notified while the mobile electronic device is determined to be in the moving state is not responded by a user of the mobile electronic device, again of the event.

BRIEF DESCRIPTION OF THE DRAWINGS

FIG. 2 is a diagram illustrating exemplary data of a notified event.

FIG. 5 is a flowchart of processing executed by the smartphone according to the present embodiment.

DETAILED DESCRIPTION OF THE PREFERRED EMBODIMENTS

Embodiments of a mobile electronic device, a control method, and a control program stored in a storage medium according to the embodiments of the present disclosure will be described in detail with reference to the accompanying drawings. The following describes a smartphone as an exemplary mobile electronic device.

Embodiment

Figure 1:
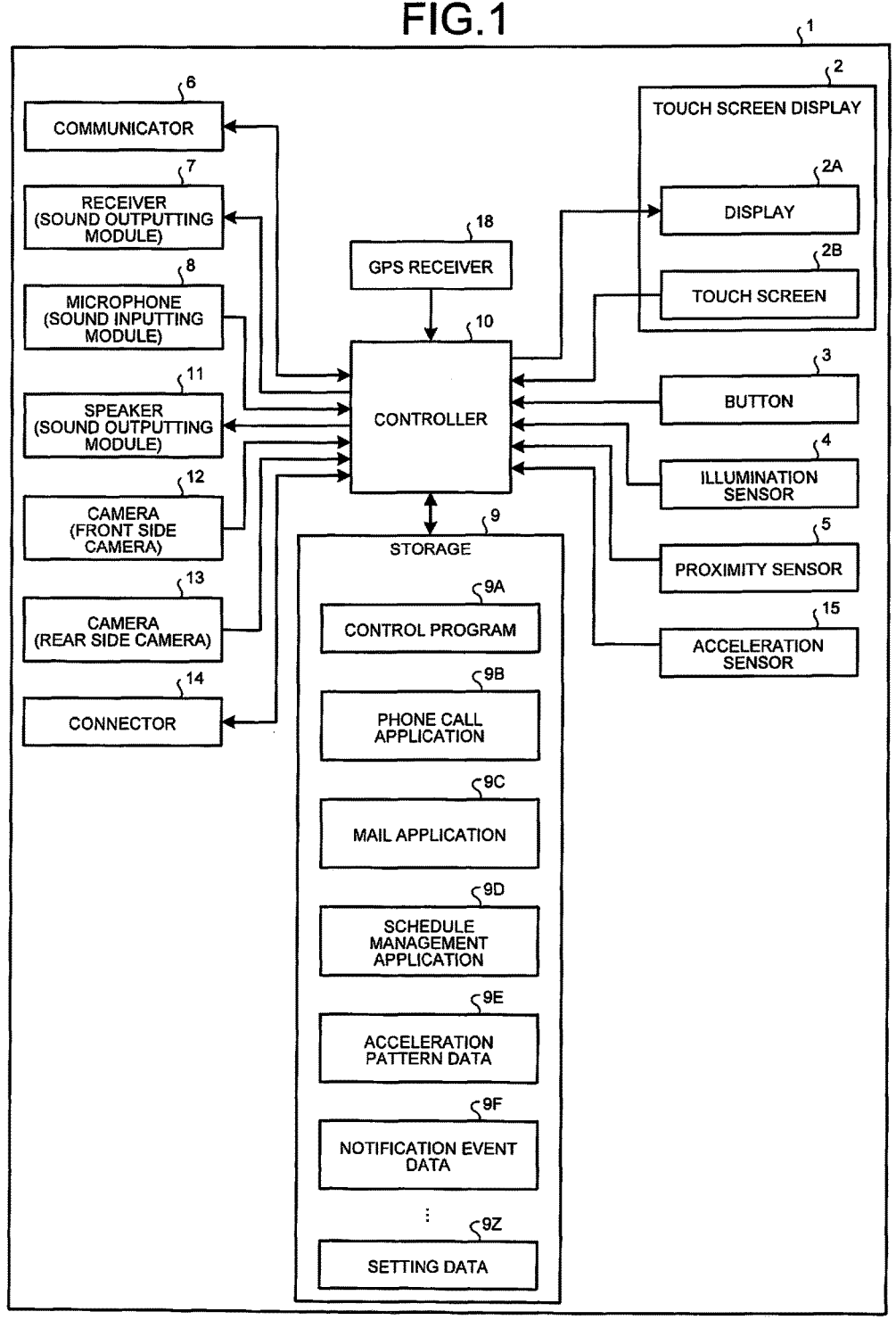
FIG. 1 is a block diagram of a functional configuration of a smartphone according to an embodiment.

An exemplary functional configuration of a smartphone 1 according to one of the embodiments will be described. FIG. 1 is a block diagram of a functional configuration of the smartphone according to the embodiment. In the following description, the equivalent components are denoted by the identical reference signs in some cases. Any duplicate description will be omitted in some cases.

As illustrated in FIG. 1, the smartphone 1 includes a touch screen display 2, a button 3, an illumination intensity sensor 4, a proximity sensor 5, a communicator 6, a receiver 7, a microphone 8, a storage 9, a controller 10, a speaker 11, a camera 12, a camera 13, a connector 14, an acceleration sensor 15, and a GPS receiver 18.

The touch screen display 2 includes a display 2A and a touch screen 2B. The display 2A and the touch screen 2B may be arranged, for example, on top of another, side by side, or separately. When the display 2A and the touch screen 2B are arranged on top of another, for example, one or a plurality of sides of the display 2A may be misaligned with any side of the touch screen 2B.

The display 2A includes a display device such as a liquid crystal display (LCD), an organic electro-luminescence display (OELD), or an inorganic electro-luminescence display (IELD). The display 2A displays a character, an image, a symbol, a figure, and the like. Examples of screens including the character, the image, the symbol, the figure, and the like displayed by the display 2A include, a screen called a lock screen, a screen called a home screen, and an application screen displayed while an application is being executed. The home screen is also called a desktop, a stand-by screen, an idle screen, a standard screen, an application list screen, or a launcher screen.

In the embodiment, the display 2A displays, for example, text or an image for notifying an user of generation of an event on the smartphone 1.

The touch screen 2B detects contact of a finger, a pen, a stylus pen, or the like (hereinafter collectively referred to as a "finger") onto the touch screen 2B. The touch screen 2B can detect a plurality of positions of contact of a finger, a pen, a stylus pen, or the like onto the touch screen 2B. The touch screen 2B notifies the controller 10 of contact of the finger onto the touch screen 2B (touch screen display 2) as well as the position of the contact on the touch screen display 2.

The touch screen 2B may perform any detection method such as a capacitive method, a resistive method, a surface acoustic wave method (or an ultrasonic method), an infrared method, an electromagnetic induction method, or a load detecting method. In the following description, in order to simplify the description, it is assumed that the user operates the smartphone 1 by contacting the finger onto the touch screen 2B.

The controller 10 (smartphone 1) determines the type of a gesture based on at least one of contact detected by the touch screen 2B, a position at which the contact is detected, any change of the position at which the contact is detected, an interval at which the contact is detected, and the number of times that the contact is detected. The gesture is an operation performed on the touch screen 2B (touch screen display 2) by the finger. Examples of the gesture determined by the controller 10 (smartphone 1) through the touch screen 2B include touch, long touch, release, swipe, tap, double tap, long tap, drag, flick, pinch-in, and pinch-out, but not limited thereto.

The button 3 receives inputting of an operation from the user. A single or plurality of buttons 3 may be provided.

The illumination intensity sensor 4 detects the illumination intensity of ambient light on the smartphone 1. The illumination intensity is equal to light beams emitted per a unit area of a light receiving element of the illumination intensity sensor 4. The illumination intensity sensor 4 is used to, for example, adjust the luminance of the display 2A.

The proximity sensor 5 detects presence of any neighboring object in a non-contacting manner. The proximity sensor 5 detects the presence of any object based on, for example, a change in a magnetic field or a change in a returning time of reflected ultrasonic waves. The proximity sensor 5 detects, for example, proximity of a face to the display 2A. The illumination intensity sensor 4 and the proximity sensor 5 may be integrated as one sensor. The illumination intensity sensor 4 may be used as a proximity sensor.

The communicator 6 performs wireless communication. Examples of wireless communication standards supported by the communicator 6 include 2G, 3G, and 4G cellular phone communication standards, and short distance wireless communication standards. Examples of the cellular phone communication standards include, Long Term Evolution (LTE), Wideband Code Division Multiple Access (W-CDMA), Worldwide Interoperability for Microwave Access (WiMAX), CDMA2000, Personal Digital Cellular (PDC), Global System for Mobile Communications (GSM) (registered trademark), and personal handy-phone system (PHS). Examples of the short distance wireless communication standards include IEEE802.11, Bluetooth (registered trademark), Infrared Data Association (IrDA), Near Field Communication (NFC), and Wireless Personal Area Network (WPAN). The WPAN communication standard is, for example, ZigBee (registered trademark). The communicator 6 may support one or a plurality of the above-described communication standards.

The receiver 7 is a sound outputting module. The receiver 7 outputs, as sound, a sound signal transmitted from the controller 10. The receiver 7 is used to, for example, output voice of a partner on calling. The microphone 8 is a sound inputting module. The microphone 8 converts the voice of the user or the like into a sound signal and transmits the sound signal to the controller 10.

The storage 9 stores therein a computer program and data. The storage 9 is used as a work area for temporarily storing therein a result of processing by the controller 10. The storage 9 may include an optional non-transitory storage medium such as a semiconductor storage medium or a magnetic storage medium. The storage 9 may include a plurality of kinds of storage media. The storage 9 may include a combination of a portable storage medium such as a memory card, an optical disk, or a magneto optical disk, and a reading device for the storage medium. The storage 9 may include a storage device such as a random access memory (RAM) used as a temporary store region.

Examples of the computer program stored in the storage 9 include an application executed in the foreground or background, and a control program that supports the operation of the application. The application executed in the foreground has its screen displayed, for example, on the display 2A. Examples of the control program include an OS. The application and the control program may be installed on the storage 9 through the wireless communication by the communicator 6 or through the non-transitory storage medium.

The storage 9 stores therein, for example, a control program 9A, a phone call application 9B, a mail application 9C, a schedule management application 9D, acceleration pattern data 9E, notification event data 9F, and setting data 9Z.

The control program 9A provides functions related to various kinds of control of the smartphone 1. The control program 9A provides a function for determining a moving state based on a result of detection by the acceleration sensor 15. For example, the control program 9A measures vibration and motion of the smartphone 1 based on a result of detection by the acceleration sensor 15, and determines the moving state of the user based on the result of the measurement of vibration and motion (hereinafter referred to as an acceleration pattern).

The control program 9A provides a function for executing processing in an operation mode corresponding to the moving state of the user. Examples of the operation mode include a moving mode corresponding to the moving state of the user, and a stopping mode corresponding to the stopping state of the user. The moving state corresponds to a state in which a change in the acceleration pattern matches, at a predetermined certainty, a change in the acceleration pattern (hereinafter referred to as a moving pattern) detected, for example, when the user is moving on foot or a vehicle. The stopping state corresponds to a state in which a change in the acceleration pattern matches, at a predetermined certainty, a change in the acceleration pattern (hereinafter referred to as a stopping pattern) detected, for example, when the user is standing still. The moving mode corresponds to a control state inside the smartphone 1 executing various kinds of processing under a condition that the user is presumed to be in the moving state. The stopping mode corresponds to a control state inside the smartphone 1 executing various kinds of processing under a condition that the user is presumed to be in the stopping state. Examples of the operation mode may include a still mode corresponding to a still state in which the smartphone 1 is placed still at a stable position. The still state corresponds to, for example, a state in which a change in the acceleration pattern matches, at a predetermined certainty, a change in the acceleration pattern (hereinafter referred to as the stopping pattern) detected when the smartphone 1 is placed still at a stable position, for example, on a desk.

The control program 9A provides a function for determining whether to change the operation mode when a change in the acceleration pattern is detected. For example, in the case of having detected a change in the acceleration pattern from the moving pattern to the stopping pattern after the smartphone 1 is determined to be in the moving state, the control program 9A determines whether the stopping pattern continues for a predetermined time or longer. If it is determined that the stopping pattern does not continue the predetermined time or longer, the control program 9A maintains a determination result that the smartphone 1 is in the moving state, and does not execute the change of the operation mode. In contrast, if it is determined that the stopping pattern continues the predetermined time or longer, the control program 9A determines that the smartphone 1 is in the stopping state, and changes the operation mode from the moving mode to the stopping mode.

The control program 9A provides a function for giving notification, if an event notified when the smartphone 1 is determined to be in the moving state is not responded by the user, again of the event. Examples of the event include incoming mail, incoming call, and pop-up notification of a schedule. The control program 9A stores, as the notification event data 9F in the storage 9, for example, information on the event notified when the smartphone 1 is determined to be in the moving state (operational in the moving mode). FIG. 2 is a diagram illustrating exemplary data (notification event data 9F) of the notified event. In the example illustrated in FIG. 2, the notification event data 9F stores therein an event generation time, event contents, and the presence or absence of a response in association with each other. The event contents correspond to, for example, incoming mail, incoming call, and pop-up notification of a schedule. The presence or absence of a response indicates, in a case of an event of incoming mail, a response being confirmed if a received mail is read or no response being confirmed if the received mail is unread, in a case of an event of incoming call, a response being confirmed if an incoming call is responded or no response being confirmed if the call is missed, and in a case of an event of pop-up notification of a schedule, a response being confirmed if there is an operation on a pop-up icon or no response being confirmed if there is no operation on the pop-up icon. In the case of having detected, for example, a change in the acceleration pattern from the moving pattern to the stopping pattern, the control program 9A determines whether there is an event notified when the smartphone 1 was determined to be in the moving state (operational in the moving mode). If it is determined that there is an event notified when the smartphone 1 is determined to be in the moving state (operational in the moving mode), the control program 9A determines whether there is any notified event that is not responded by the user. If it is determined that there is a notified event that is not responded by the user, the control program 9A notifies the event again.

The phone call application 9B provides a calling function for a call through wireless communication. The mail application 9C provides an electronic mail function for composition, transmission, reception, display, and the like of an electronic mail. The schedule management application 9D provides a function for providing various kinds of information on schedule. The schedule management application 9D executes, for example, pop-up notification of a schedule registered by the user. The acceleration pattern data 9E includes information on a change in the acceleration pattern corresponding to the moving pattern, and information on a change in the acceleration pattern corresponding to the stopping pattern. The notification event data 9F includes information on an event notified when the smartphone 1 is determined to be in the moving state (operational in the moving mode) (refer to FIG. 2). The storage 9 may store therein, for example, a note application, a browser application, a navigation application, a music player application, a video playback application, a calculator application, and a sticky note application in addition to those illustrated in FIG. 1.

The setting data 9Z includes information on various settings related to the operation of the smartphone 1. In the present embodiment, the setting data 9Z includes, for example, information on the current operation mode (the moving mode or the stopping mode).

The controller 10 is a processor. Examples of the processor include a central processing unit (CPU), a system-on-a-chip (SoC), a micro control unit (MCU), a field-programmable gate array (FPGA), and a coprocessor, but not limited thereto. The controller 10 achieves various functions by integrally controlling the operation of the smartphone 1. The controller 10 is an exemplary controller.

Specifically, the controller 10 executes a command included in a computer program stored in the storage 9 by referring to data stored in the storage 9 as necessary. The controller 10 achieves various functions by controlling a functional component depending on data and commands. Examples of the functional component include the display 2A, the communicator 6, the microphone 8, and the speaker 11, but not limited thereto. The controller 10 may change control depending on a result of detection by a detector. Examples of the detector include the touch screen 2B, the button 3, the illumination intensity sensor 4, the proximity sensor 5, the microphone 8, the camera 12, the camera 13, and the acceleration sensor 15, but not limited thereto.

By executing the control program 9A, the controller 10 executes, for example, processing related to various kinds of control of the smartphone 1. By executing the control program 9A, the controller 10 executes, for example, processing of determining the moving state based on a result of detection by the acceleration sensor 15. By executing the control program 9A, the controller 10 executes, for example, processing in the operation mode corresponding to the moving state of the user. By executing the control program 9A, the controller 10 executes, for example, processing of determining whether to change the operation mode when a change in the acceleration pattern is detected. By executing the control program 9A, the controller 10 notifies, for example, if an event notified when the smartphone 1 is determined to be in the moving state is not responded by the user, the event again.

The speaker 11 is a sound outputting module. The speaker 11 outputs, as sound, a sound signal transmitted from the controller 10. The speaker 11 is used to output, for example, ringtone and music. One of the receiver 7 and the speaker 11 may have the function of the other.

The camera 12 and the camera 13 each convert a captured image into an electric signal. The camera 12 is a front side camera configured to capture an image of an object facing the display 2A. The camera 13 is a rear side camera configured to capture an image of an object facing the back surface of the display 2A. The camera 12 and the camera 13 may be installed in the smartphone 1 while being functionally and physically integrated together as a camera which can be used as the front side camera and the rear side camera in a switchable manner.

The connector 14 is a terminal to which another device can be connected. The connector 14 may be a general-purpose terminal for a Universal Serial Bus (USB), High-Definition Multimedia Interface (HDMI) (registered trademark), Light Peak (Thunderbolt (registered trademark)), or an earphone/microphone connector. The connector 14 may be a dedicated terminal such as a Dock connector. Examples of devices connected with the connector 14 include an external storage, a speaker, and a communication device, but not limited thereto.

The acceleration sensor 15 detects vibration and motion of the smartphone 1 based on direction and magnitude of acceleration of the smartphone 1. The acceleration sensor 15 generates a signal corresponding to a result of detection of the vibration and motion of the smartphone 1. The generated signal is input into the controller 10. The acceleration sensor 15 is an exemplary acceleration detector. The smartphone 1 may include, in place of the acceleration sensor 15, a detection unit in which the acceleration sensor 15, an orientation sensor, and a gyroscope are integrated functionally and physically.

The GPS receiver 18 receives a radiowave signal in a predetermined frequency band from GPS satellites, performs demodulation processing on the received radiowave signal, and transmits the processed signal to the controller 10.

The smartphone 1 may include, for example, a vibrator in addition to the above-described functional components. The vibrator vibrates a part or the entirety of the smartphone 1 or the entire smartphone 1. The vibrator includes, for example, a piezoelectric element or an eccentric motor in order to generate vibration. Vibration generated by the vibrator is used to notify the user of various events including incoming call. In the present embodiment, the smartphone 1 includes functional components, such as a battery, used inevitably to maintain the function of the smartphone 1.

Figure 3:
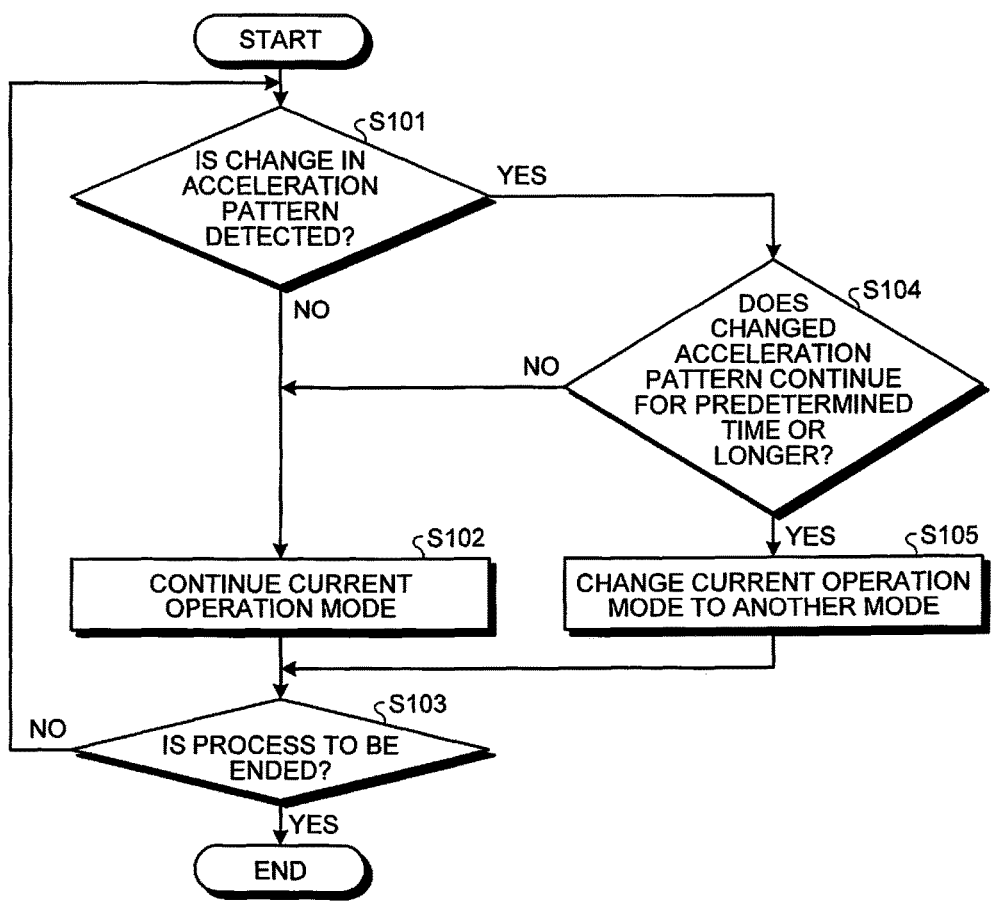
FIG. 3 is a flowchart of processing executed by the smartphone according to the present embodiment.
Figure 4:
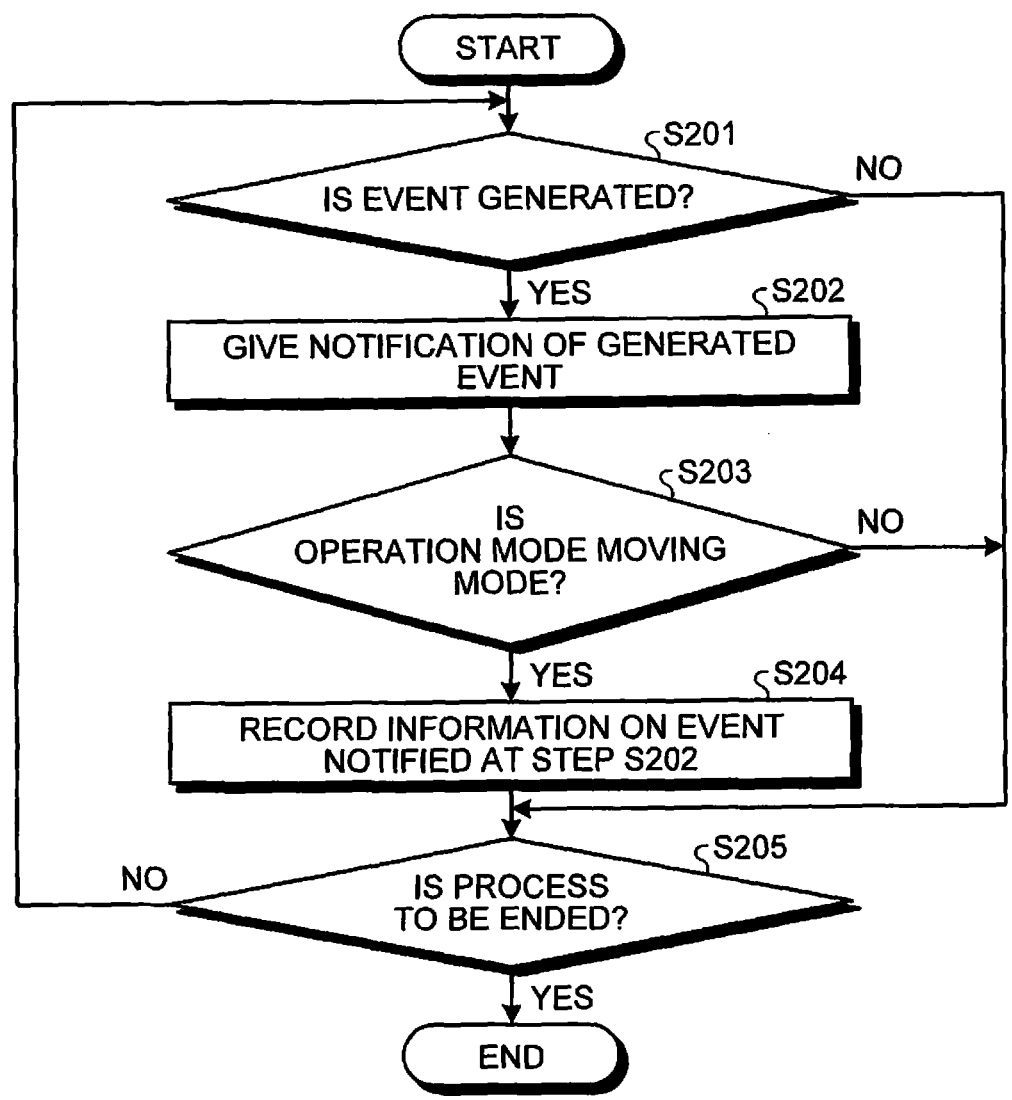
FIG. 4 is a flowchart of processing executed by the smartphone according to the present embodiment.

The following describes the process of processing executed by the smartphone 1 according to the present embodiment with reference to FIGS. 3 to 5. Each of FIGS. 3 to 5 shows a flowchart of the process of processing executed by the smartphone 1 according to the present embodiment. The processings illustrated in FIGS. 3 to 5 are achieved by the controller 10 executing, for example, the control program 9A stored in the storage 9. The processings illustrated in FIGS. 3 to 5 are individually executed in parallel.

The process of processing for changing the operation mode according to the present embodiment will be described with reference to FIG. 3. As illustrated in FIG. 3, the controller 10 determines whether a change in the acceleration pattern is detected (step S101). In the present embodiment, the controller 10 detects, based on a result of detection by the acceleration sensor 15, whether the acceleration pattern is changed from the moving pattern to the stopping pattern, or whether the acceleration pattern is changed from the stopping pattern to the moving pattern.

If it is determined that no change in the acceleration pattern is detected (No at step S101), the controller 10 continues the current operation mode (step S102). Subsequently, the controller 10 determines whether to end the process (step S103). Examples of the case where the process is to be ended include a case where the power is turned off and a case where a process end operation is executed by the user.

If it is determined that the process is to be ended (Yes at step S103), the controller 10 ends the process illustrated in FIG. 3. In contrast, if the process is not to be end (No at step S103), the controller 10 causes the process to return to the processing procedure at the above-described step S101 and executes detection of a change in the acceleration pattern.

At the above-described step S101, if it is determined that a change in the acceleration pattern is detected (Yes at step S101), the controller 10 determines whether the changed acceleration pattern thus detected continues for a predetermined time or longer (step S104).

If it is determined that the changed acceleration pattern thus detected continues for the predetermined time or longer (Yes at step S104), the controller 10 changes the current operation mode to another mode (step S105). In the present embodiment, the controller 10 changes to the stopping mode when the current operation mode is the moving mode, or changes to the moving mode when the current operation mode is the stopping mode. Subsequently, the controller 10 causes the process to proceed to the processing procedure at the above-described step S103.

In contrast, if it is determined that the changed acceleration pattern thus detected does not continue for the predetermined time or longer (No at step S104), the controller 10 causes the process to proceed to the above-described step S102 and continues the current operation mode.

The process of processing of recording event information according to the present embodiment will be described with reference to FIG. 4. As illustrated in FIG. 4, the controller 10 determines whether an event is generated (step S201).

If it is determined that an event is generated (Yes at step S201), the controller 10 gives notification of the generated event (step S202). Subsequently, the controller 10 determines whether the current operation mode is the moving mode (step S203).

If it is determined that the current operation mode is the moving mode (Yes at step S203), the controller 10 records in the storage 9, information on the event notified at step S202 (step S204). In the present embodiment, the controller 10 records, as the information on the event, the event generation time, the event contents, and the presence or absence of the response in association with each other (refer to FIG. 2). Subsequently, the controller 10 determines whether to end the process (step S205). Examples of the case where the process is to be ended include a case where the power is turned off and a case where a process end operation is executed by the user.

If it is determined that the process is to be ended (Yes at step S205), the controller 10 ends the process illustrated in FIG. 4. In contrast, if the process is not to be end (No at step S205), the controller 10 causes the process to return to the processing procedure at the above-described step S201 and executes the determination of whether an event is generated.

At the above-described step S203, if it is determined that the current operation mode is not the moving mode (No at step S203), the controller 10 causes the process to proceed to the processing procedure at the above-described step S205.

At the above-described step S201, if it is determined that no event is generated (No at step S201), the controller 10 causes the process to proceed to the processing procedure at the above-described step S205.

The process of processing of notifying an event again according to the present embodiment will be described with reference to FIG. 5. As illustrated in FIG. 5, the controller 10 determines whether a change in the acceleration pattern from the moving pattern to the stopping pattern is detected (step S301).

If it is determined that a change from the moving pattern to the stopping pattern is detected (Yes at step S301), the controller 10 determines whether there are any events generated in the moving mode by referring to the notification event data 9F stored in the storage 9 (step S302).

If it is determined that there are any events generated in the moving mode (Yes at step S302), the controller 10 determines whether the events generated in the moving mode include any events that are not responded by the user (step S303).

If it is determined that there are any events that are not responded by the user (Yes at step S303), the controller 10 gives notification again of the events not responded (step S304). Subsequently, the controller 10 determines whether to end the process (step S305). Examples of the case where the process is to be ended include a case where the power is turned off and a case where a process end operation is executed by the user.

If it is determined that the process is to be ended (Yes at step S305), the controller 10 ends the process illustrated in FIG. 5. In contrast, if the process is not to be end (No at step S305), the controller 10 causes the process to return to the processing procedure at the above-described step S301 and executes the determination of whether a change from the moving pattern to the stopping pattern is detected.

At the above-described step S303, if it is determined that there are any events that are not responded by the user (No at step S303), the controller 10 causes the process to proceed to the processing procedure at the above-described step S305.

At the above-described step S302, if it is determined that there are any events generated in the moving mode (No at step S302), the controller 10 causes the process to proceed to the processing procedure at the above-described step S305.

At the above-described step S301, if it is determined that no change from the moving pattern to the stopping pattern is detected (No at step S301), the controller 10 causes the process to proceed to the processing procedure at the above-described step S305.

In the present embodiment, if a change in the acceleration pattern from the moving pattern to the stopping pattern is detected, the smartphone 1 determines whether there are any events notified when the smartphone 1 is determined to be in the moving state (operational in the moving mode). Subsequently, if there are any events notified when the smartphone 1 is determined to be in the moving state (operational in the moving mode), the smartphone 1 determines whether the notified events include any events that are not responded by the user. Subsequently, if it is determined that the notified events include any events that are not responded by the user, the smartphone 1 gives notification again of the event. Accordingly, the smartphone 1 according to the present embodiment allows the user to recognize the information on the event generated while moving fast and reliably.

In the present embodiment, the smartphone 1 executes again notification of an event generated while being operated in the moving mode, corresponding to the moving state of the user. For example, when movement is stopped for a time not long enough to change the operation mode from the moving mode to the stopping mode, the smartphone 1 continues processing in the moving mode irrespective of the actual operation state by the user. Accordingly, under a condition that the user is presumed to be continuously moving, the smartphone 1 according to the present embodiment can actively detect any temporal stop during the movement, and give notification again of any events not responded among events generated while the user is moving.

Embodiments describe a smartphone as an exemplary device according to the accompanying claims, but the device according to the accompanying claims is not limited to the smartphone. The device according to the accompanying claims may be any electronic device other than a smartphone, such as a mobile phone or a tablet, having a function of giving notification of an event and is portable with the user.

The above description is made on characteristic embodiments so as to disclose completely and clearly the technology according to the accompanying claims. However, the accompanying claims are not limited to the above-described embodiments, but should be achieved through all modifications and interchangeable configurations that could be thought of by the skilled person in the art in the technical field within the scope of the fundamental matter described in the present specification.

The invention claimed is:

1. A control method executed by a mobile electronic device including an acceleration detector, the method comprising:
   determining a moving state of the mobile electronic device based on an acceleration pattern measured through a result of detection by the acceleration detector; and
   in response to a change in the acceleration pattern indicating that movement of the mobile electronic device is stopped,
      giving notification, when an event notified while the mobile electronic device is determined to be in the moving state is not responded by a user of the mobile electronic device, again of the event at a timing at which the change in the acceleration pattern continues for less than a predetermined time and an operation mode corresponding to the moving state is not changed from a moving mode to a stopping mode, and
      changing the operation mode corresponding to the moving state from the moving mode to the stopping mode when the change in the acceleration pattern continues for the predetermined time or longer.

* * * * *